(12) United States Patent
Tomita et al.

(10) Patent No.: US 7,020,564 B2
(45) Date of Patent: Mar. 28, 2006

(54) LOGICAL VOLUME ADMINISTRATION METHOD, THE SERVICE USING THE METHOD AND THE MEMORY MEDIUM STORING THE SERVICE

(75) Inventors: Aki Tomita, Tachikawa (JP); Hiroki Kanai, Higashiyamato (JP)

(73) Assignee: Hitachi, Ltd., Tokyo (JP)

( * ) Notice: Subject to any disclaimer, the term of this patent is extended or adjusted under 35 U.S.C. 154(b) by 680 days.

(21) Appl. No.: 09/923,340

(22) Filed: Aug. 8, 2001

(65) Prior Publication Data
US 2002/0049823 A1    Apr. 25, 2002

(30) Foreign Application Priority Data
Oct. 23, 2000  (JP)  .............................. 2000-322333

(51) Int. Cl.
*H04N 5/781* (2006.01)

(52) U.S. Cl. .................. 702/52; 386/125; 386/186

(58) Field of Classification Search ................ 709/212, 709/225; 725/92, 93, 115; 386/125, 126; 711/114, 156
See application file for complete search history.

(56) References Cited

U.S. PATENT DOCUMENTS 6,343,324 B1 * 1/2002 Hubis et al. ................. 709/229
2002/0034379 A1 * 3/2002 Tanaka ......................... 386/125

FOREIGN PATENT DOCUMENTS

JP          2000-242757        *  8/2000

* cited by examiner

*Primary Examiner*—Kamini Shah
(74) *Attorney, Agent, or Firm*—Reed Smith LLP; Stanley P. Fisher, Esq.; Juan Carlos A. Marquez, Esq.

(57) ABSTRACT

To provide a logical volume administration method capable of reducing a cost of using a storage, a logical volume is constructed by a steady area corresponding to a task of steadily allocating a disk area and a temporary area corresponding to a task of allocating no disk area until allocation of a disk area is requested. The disk area to be allocated to the temporary area is commonly used by a plurality of logical volumes in a time sharing manner. The disk areas are administered in a lump as a disk pool. The cost to each of customers sharing the temporary area is calculated by total use time×use size and is charged.

9 Claims, 15 Drawing Sheets

FIG.3

| STEADY AREA | | TEMPORARY AREA | | |
|---|---|---|---|---|
| PRESENCE OR ABSENCE | SIZE | PRESENCE OR ABSENCE | INITIAL PRIORITY | MAXIMUM SIZE |
| 301 | 302 | 303 | 304 | 305 |

300

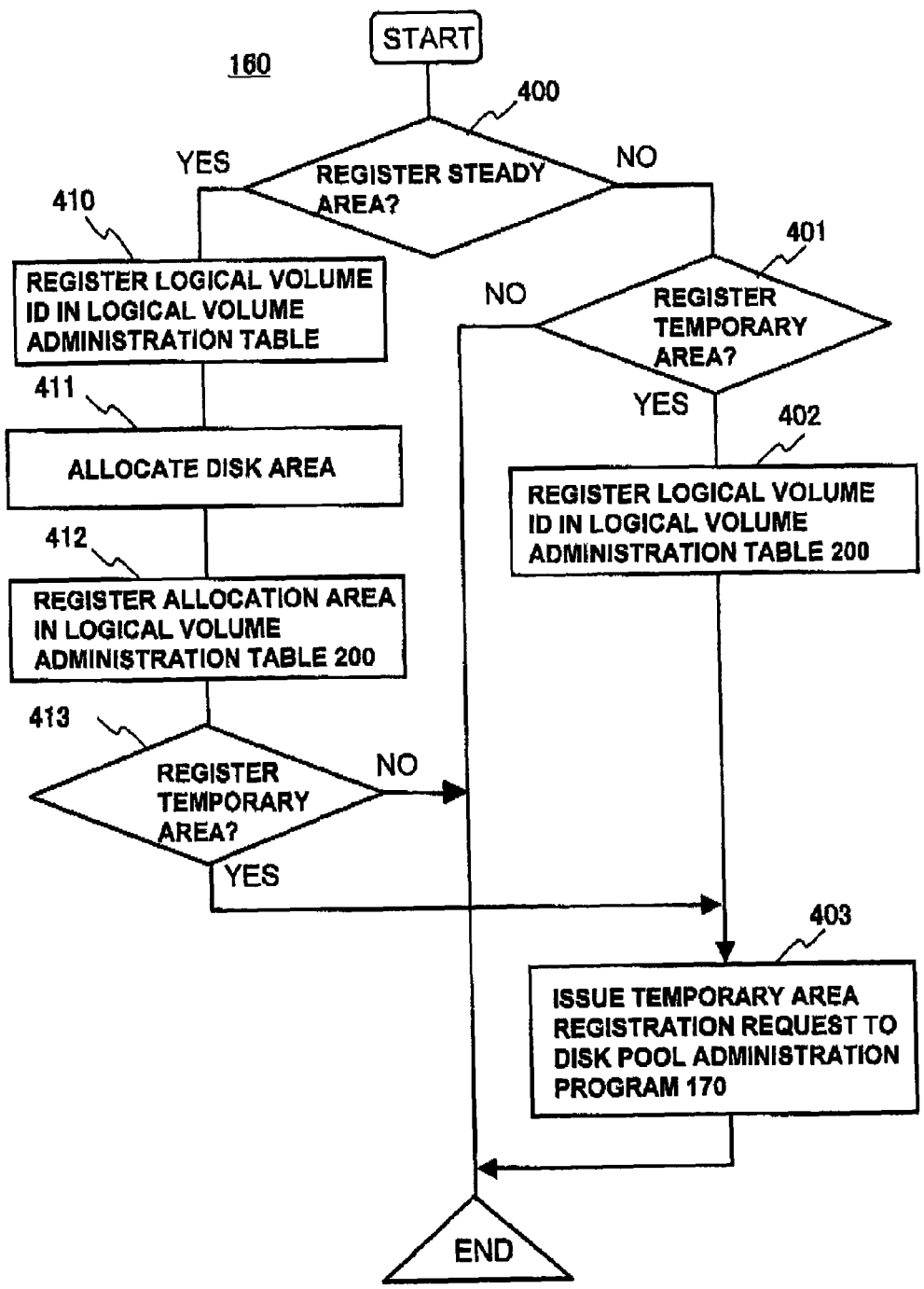

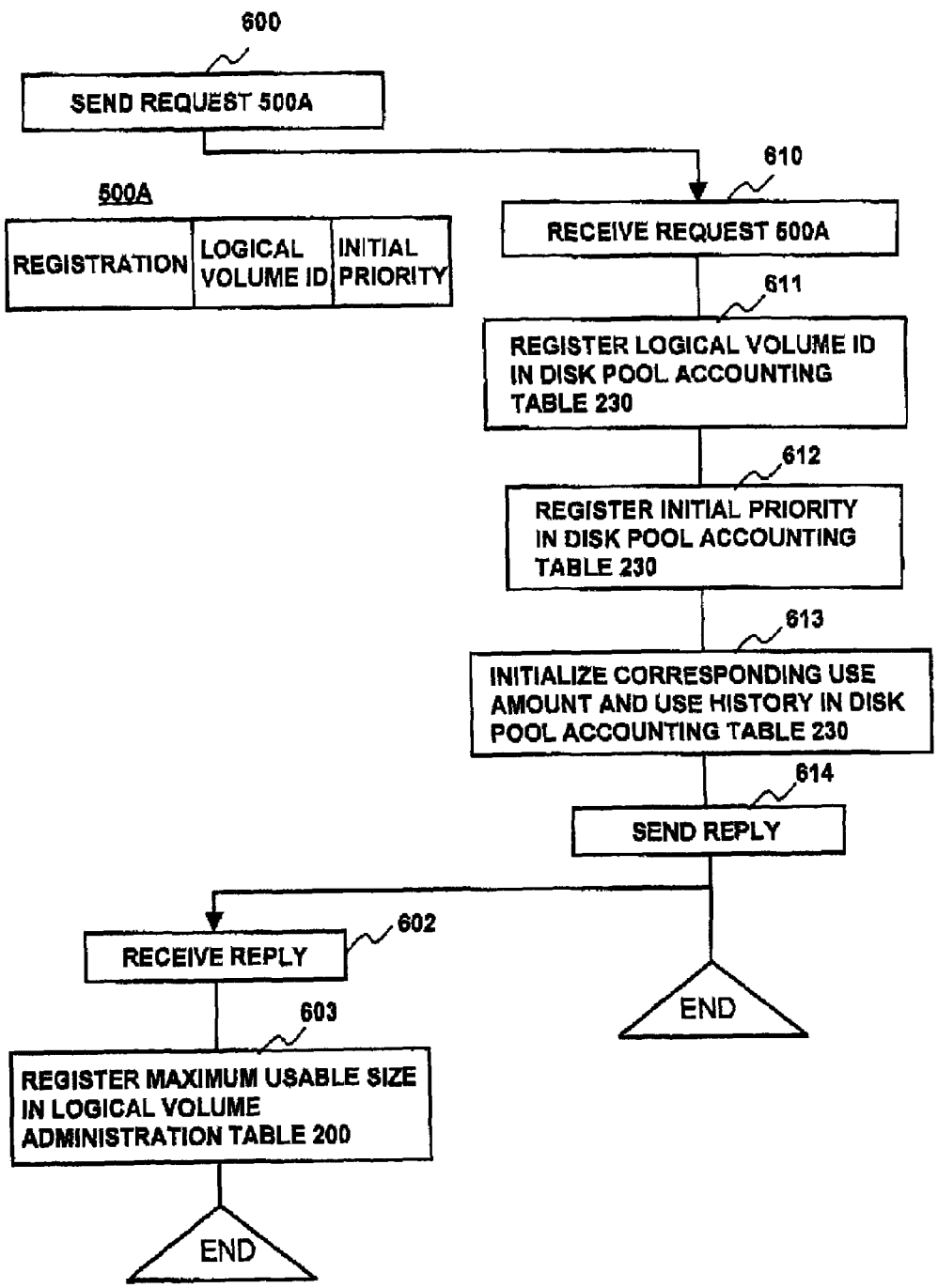

FIG. 12

| CONTRACT PERIOD | SREADY AREA | TEMPORARY AREA | | | | PRICE |
| --- | --- | --- | --- | --- | --- | --- |
| | SIZE | INITIAL PRIORITY | MAXIMUM USABLE SIZE | USAGE UNIT PRICE ($/TB × Hr) | COST FOR EXCEEDED SIZE | |
| A MONTH | | | | | | |
| THREE MONTHS | | | | | | |
| SIX MONTHS | | | | | | |
| - - - - | | | | | | |
| THREE YEARS | | | | | | |

Prior Art.

Prior Art.

LOGICAL VOLUME ADMINISTRATION METHOD, THE SERVICE USING THE METHOD AND THE MEMORY MEDIUM STORING THE SERVICE

BACKGROUND OF THE INVENTION

The present invention relates to a logical volume administration method and, more particularly, a method of administrating a logical unit in a disk memory apparatus.

In recent years, electronic commerce has been being rapidly spread in association with the penetration of the Internet into the market. In the electronic commerce, the user accesses a Web site of a company through the Internet to do shopping. When a physical store is newly open, people in the neighborhood notice it. In these days of a large number of Web pages in the world reaching one billion, even if a Web site is established, the possibility that no one notices it and nothing is sold is high. On the other hand, when the user uses the Web sites, there are no restrictions from a geometrical and time viewpoints. Companies can regard the people all over the world as potential customers, so that there is a big business chance. In order to improve CRM (Customer Relationship Management), some companies providing Web pages try to know their customers well even by tracing mouse clicks of the customers.

FIG. 15 is a conceptual diagram for explaining the relation between the users and a data center for collecting data of trace of user's mouse clicks to conduct CRM analysis. A number of users indicated by user 1, user 2, . . . and user N access Web serves in the data center via the Internet 1. The data center has a number of Web servers indicated by Web server 1, Web server 2, . . . and Web server M. The Web servers are connected to a disk apparatus via a disk server by using a LAN of the data center. In the disk apparatus, a Web page repository, a Web access history repository, and CRM analyzing data are distributed to proper disks and stored. To the LAN of the data center, further, CRM analyzing servers 1 and 2 are connected, a tape apparatus is connected via a tape server, and also a manager for monitoring and controlling these components is also connected.

Web pages of companies providing the Web sites are stored in the Web page repository. When the user accesses a Web server in the data center via the Internet 1, the Web server reads the Web page from the Web page repository and sends it to the user. Simultaneously, the history of the access to the Web site by the user is written to the Web access history repository. When the amount of the Web access history data exceeds a specific value, the manager transfers the Web access history data to the tape apparatus and records the data to a tape for backup. In the case of performing CRM analysis on the Web access history data, the backup data recorded on the tape is transferred from the tape apparatus to the Web access history repository. The CRM analysis is made by the CRM analyzing server by using the transferred data. The result of analysis is stored as CRM analyzing data of the disk apparatus.

Referring to FIG. 14, an example of the form of business done via a Web page will be described. As already stated with reference to FIG. 15, a number of users access Web sites to purchase products or to get service. Each of the Web sites is administered by a Web site operator who enters into a contract with each of a number of companies providing Web pages to run and maintain their Web sites. Although it is possible that the Web site operator has a storage to perform operations, usually, the Web site operator enters into a contract with a storage operator for operating a storage in order to fulfill the contract with the Web page providing companies. Further, although it is possible that the storage operator has a storage to perform operations, usually, the storage operator enters into a contract with a storage provider for providing a storage to fulfill the contract with the Web site operator.

With such a configuration, a number of users can access an arbitrary Web site. Many companies providing Web pages and Web site operator think about obtaining CRM analyzing data as information to make their Web sites utilized more effectively. A CRM analyzer for periodically providing CRM analyzing data under contract with the companies and Web site operators consequently exists. Although FIG. 15 shows those organizations as one data center, in the industry of storage dealing with an enormous amount of data, the business form in which the functions are distributed as described above is being fixed.

The amount of data stored for CRM analysis is enormous. In some companies, data increases by 1T bytes per month. A storage system is requested to provide a support function by which the operator can make capacity planning. For example, there is American storage administration software for disk arrays, by which I/O throughput of each port or each disk can be measured. By the software, for example, when I/O requests are concentrated on a certain disk, the data is reallocated to distribute the load, thereby enabling improved performance to be achieved. When it is predicted from data capacity increasing rate that a disk will become full in two months, addition of a disk can be planned. Similarly, there is another storage administration software for disk arrays, having the function of displaying disk operation information.

In recent years, the price of the disk memory apparatus has been being lowered. However, with respect to data increasing at a rate of 1T bytes per month, the disk memory apparatus is still expensive as a total. As described above, therefore, log data as stated above is stored in a cheaper memory device such as a magnetic tape. It is to be noted here that the purpose is not to store log data but to understand the users more by analyzing the log data to thereby improve the CRM. That is, the stored log data has to be analyzed. At the time of analysis, the log data has to be stored on a magnetic disk memory apparatus and has to be processed into a database record. When log data is stored into a normal relational database, the size increases by a few times. In the case where logs are stored, it is sufficient to store the log onto a magnetic tape when a disk becomes full. As a result, however, a magnetic disk of a large capacity capable of storing log data is necessary for analysis. One of the advantages of Internet shopping for the user is low price. If the CRM cost is high, it is difficult for a company to maintain a low price. Reduction in the CRM cost is one of big subjects of E-commerce companies.

SUMMARY OF THE INVENTION

IT costs of a company increase more and more. Attention is now being focused on a business of outsourcing an IT section such as ASP (Application Service Provider) or SSP (Storage Service Provider). It is predicted in the market that, in future, sales to an ASP or SSP vender will occupy a majority of sales of a storage vender. The existing ASP or SSP only hosts a Web site and stores data for a company. As described above, since the cost of storing data in association with analysis is high, if the ASP or SSP can provide cheap analysis service, there is the possibility that the analysis is also commercialized. If a data administration method for making the ASP or SSP provide cheap analysis service by using a magnetic disk memory apparatus as a part of the capacity planning supporting function which is being provided to a storage operator nowadays is provided, competitiveness in the market can be increased.

An object of the invention is to provide a logical volume administration method for reducing the cost of data storage in association with analysis.

In order to achieve the object, in a logical volume administration method of the invention, a logical volume is constructed by a steady area corresponding to a task of steadily allocating a disk area and a temporary area corresponding to a task of allocating no disk area until allocation of a disk area is requested. To the temporary area, a disk area is allocated as necessary in accordance with a task from disk areas (disk pool) which are not commanded by any tasks. For example, in the case of analyzing data of a company A providing a Web site described above, a disk pool is allocated to the temporary area in a logical volume A allocated to an analysis application executed for the company A, to store analysis data. In the case of analyzing data of a company B providing a Web site, a disk pool is allocated to the temporary area in a logical volume B allocated to an analysis application executed for the company B, to store analysis data. If the analysis execution time is adjusted between the companies A and B, the storage price which has to be conventionally paid by one user can be shared by the two companies, so that the cost of storing data in association with analysis is reduced. The order of analysis execution is determined according to the priorities determined on the companies A and B (logical volumes A and B). The storage service provider charges the company in accordance with the priority of the logical volume, maximum allocable size of the disk pool, and total use time×use size. The steady area is used as a data area for smoothly performing the operations of the system such as provision of a Web page and collection of access data.

The logical volume administration method according to the invention can provide a allocation status of a disk pool and an allocation wait status at the time of designation. Consequently, the Web site operator and the storage operator can examine a disk pool operating method of a higher cost performance on the basis of the results provided.

BRIEF DESCRIPTION OF THE DRAWINGS

FIG. 3 is a diagram showing an example of the format of a logical volume generation command of the invention.

FIG. 4 is a flowchart of a logical volume administration program for executing the logical volume generation command of the invention.

FIG. 6 is a flowchart of temporary area registration of the invention.

FIG. 12 is a diagram showing an example of the format of a logical volume price list of the invention.

DESCRIPTION OF THE PREFERRED EMBODIMENT

Figure 1:
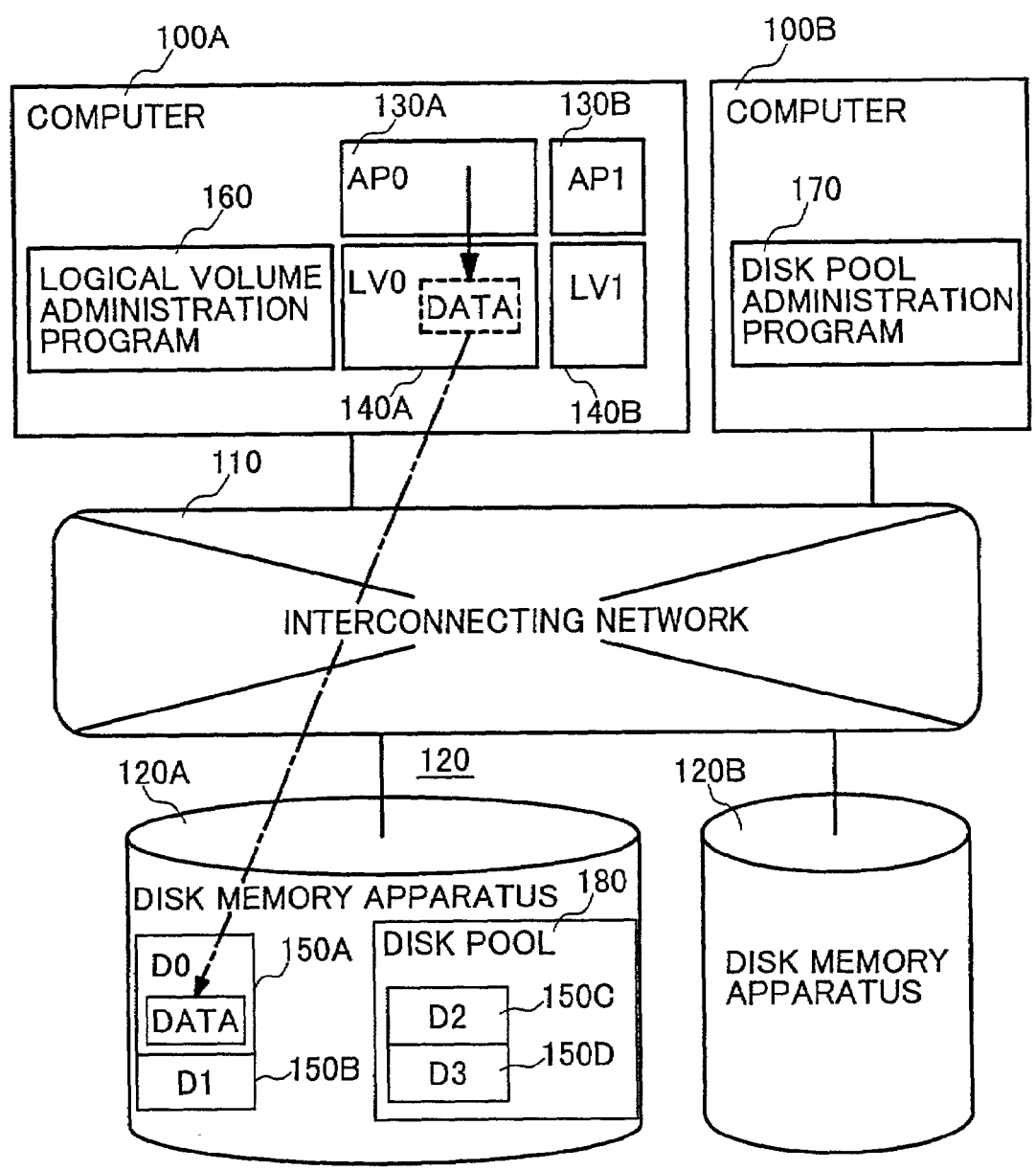
FIG. 1 is a block diagram showing an example of a computer system for executing a logical volume administration method of the invention.

FIG. 1 shows an example of a computer system for executing a logical volume administration method according to the invention. The computer system is constructed by computers 100 (100A and 100B) for executing applications 130 (130A and 130B), a logical volume administration program 160, and a disk pool administration program 170, disk memory apparatuses 120 (120A and 120B) for storing data used by the applications 130, and an interconnecting network 110 for connecting the disk memory apparatuses 120 and computers 100.

Figure 15:
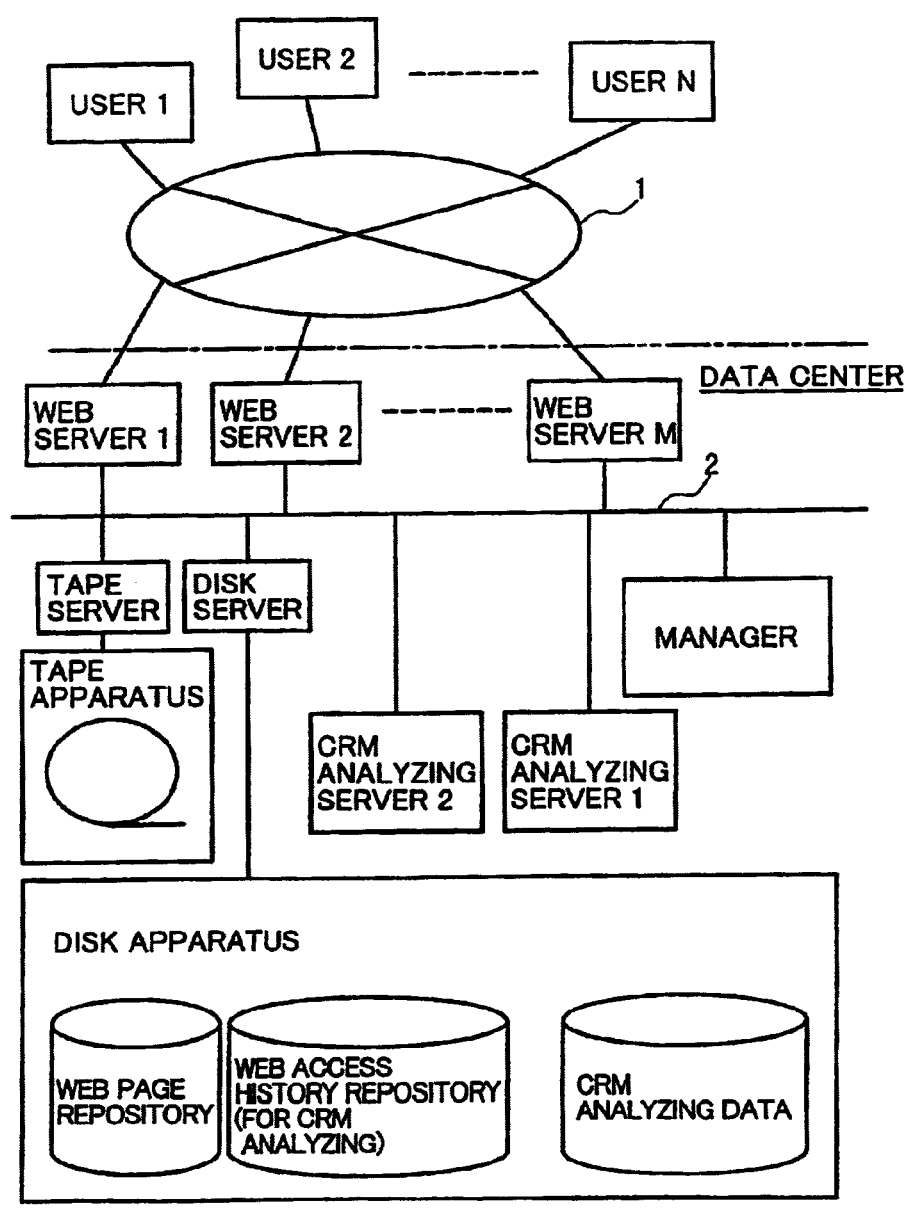
FIG. 15 is a diagram for explaining environment requiring the logical volume administration method of the invention.

Data storage areas in the disk memory apparatus 120 are administered by disk areas (150A, 150B, 150C, and 150D) each having a fixed length. When data is read/written by the application 130, a read/write request is issued not directly to the disk area 150 but to a logical volume 140. The logical volume administration program 160 makes the logical volume 140 and the disk area 150 correspond with each other. Some disk areas 150 belong to a disk pool 180. Data of one logical volume is steadily stored in each of the disk areas (150A and 150B) which do not belong to the disk pool 180. Data of a plurality of logical volumes is stored into the disk areas (150C and 150D) belonging to the disk pool 180 in a time sharing manner. When data is not stored in the disk areas, it is stored on a tertiary memory apparatus such as a magnetic tape apparatus. The disk pool administration program 170 administers allocation of disk areas in the disk pool 180. Although only the disk memory apparatus 120A in the disk memory apparatuses 120 has been described by referring to the drawing, the disk memory apparatus 120B is similarly constructed. The computer 100B corresponds to the computer described as the manager in FIG. 15. The disk memory apparatus 120 corresponds to the disk apparatus in FIG. 15. More specifically, the Web page repository and the Web access history repository in the period of obtaining Web access history in the disk apparatus in FIG. 15 correspond to the disk areas (150A and 150B) which do not belong to the disk pool 180.

Figure 2:
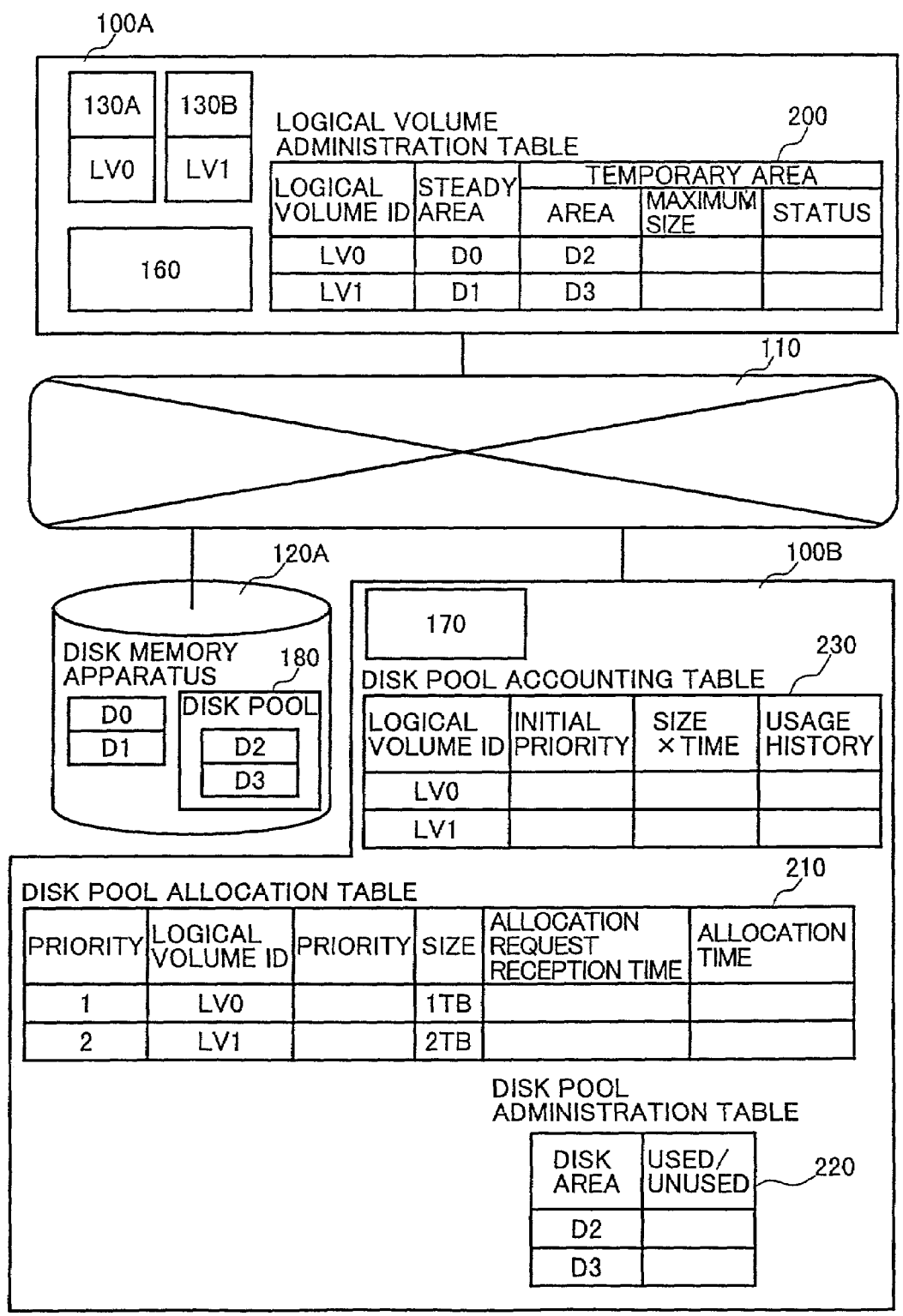
FIG. 2 is a block diagram showing an example of software structure of the logical volume administration method of the invention.

FIG. 2 shows an example of the software structure of the logical volume administration method of the invention. Although concrete description of allocating the disk areas will be given later, an outline will be given as follows.

A logical volume administration table 200 holds information regarding logical volumes. The logical volume of the invention is constructed by a steady area and a temporary area. At the time of generating a logical volume, a disk area is allocated to the steady area. A disk area is not steadily allocated to the temporary area. The disk areas in the disk pool 180 are allocated in a time sharing manner to a plurality of logical volumes for the temporary area. In the example of the drawing, in the logical volume administration table 200, disk areas D0 and D1 are allocated to steady areas of logical volumes LV0 and LV1, respectively. In the case of allocating the disk area to the temporary area, the logical volume administration program 160 designates an allocation size and issues a temporary area allocation request to the disk pool administration program 170. The disk pool administration program 170 allocates the disk areas in accordance with the priority of the temporary area. The priority and allocation maximum size are designated at the time of generating a logical volume including a temporary area. When the allocation of the disk area to the temporary area is succeeded, the disk area allocated in the logical volume administration table 200 is registered. In the example of the drawing, in the logical volume administration table 200, a disk area D2 is registered in the temporary area of the logical volume LV0. When no disk area is allocated for an issued allocation request and an allocation wait notification is received, an allocation wait status is registered in the column of "status" in the logical volume administration table.

In the steady area, data which has to stay resident on a disk from a viewpoint of system operation, such as the Web page repository or Web access history repository in the period of obtaining Web access history is stored. In the temporary area, data which does not have to stay resident on a disk is stored. Only when the data has to be processed, a necessary disk area is allocated. After completion of the data process, the logical volume administration program 160 issues a temporary area free request to the disk pool administration program 170 to let the disk area allocated to the temporary area free.

A disk pool allocation table 210 holds information related to a temporary area allocation request which is received by the disk pool administration program 170 and for which a disk area is being allocated or an allocation wait status is obtained. A disk pool administration table 220 holds a use status indicating whether each of disk areas in the disk pool is being used or unused. A disk pool accounting table 230 holds (initial) priority, a used amount (a numerical value obtained by multiplying the allocated disk area size by allocated time), and use history of each logical volume.

FIG. 3 shows an example of the format of a logical volume generation command 300 of the invention. The administrator or administration software issues a generation command. For the steady area, the presence or absence and the size of a logical volume are designated. For the temporary area, the presence or absence, initial priority, and the maximum size of a logical volume are designated.

FIG. 4 is a flowchart of the logical volume administration program 160 which executes the logical volume generation command 300. Whether the generation command 300 registers a disk area into the steady area or not is checked (step 400). If YES, a logical volume ID is generated and registered in the logical volume administration table 200 (step 410). A disk area is allocated (step 411), and the allocated disk area is registered in the logical volume administration table 200 (step 412). Subsequently, whether a disk area is to be registered in the temporary area or not is checked (step 413). If NO, the routine is finished. If YES, a temporary area registering request is sent to the disk pool administration program 170 (step 403). When no disk area is to be registered in the steady area (NO in step 400), whether a disk area is registered in a temporary area or not is checked (step 401). If YES, a logical volume ID is generated and registered in the logical volume administration table 200 (step 402). A temporary area registration request is sent to the disk pool management program 170 (step 403). If a disk area is not registered in the temporary area, the routine is finished.

Figure 5A:
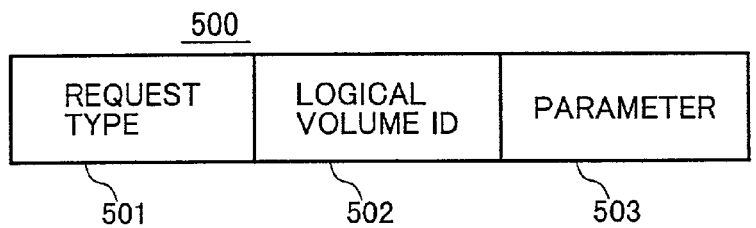
FIGS. 5A to 5E are diagrams each showing an example of the format of a temporary area request of the invention.
Figure 5B:
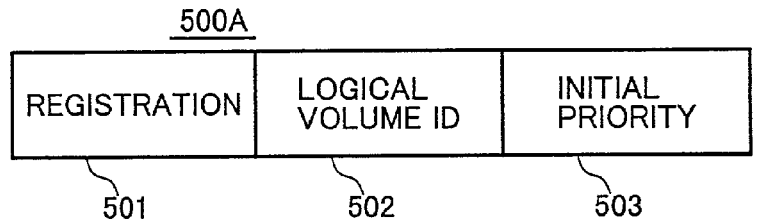
Figure 5C:
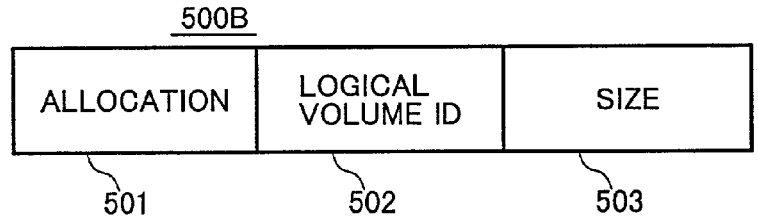
Figure 5D:
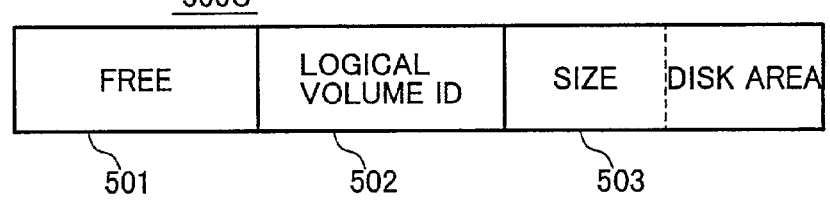
Figure 5E:
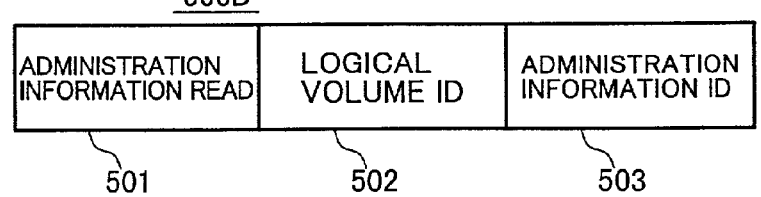

FIGS. 5A to 5E show formats of a temporary area request issued by the logical volume administration program 160 to the disk pool administration program 170. FIG. 5A show a basic configuration 500 of the format of a request, which is constructed by an area 501 for designating a request type, an area 502 for designating a logical volume ID, and an area 503 for designating a parameter according to the request type. FIG. 5B shows an example of a registration request 500A in which "registration" is set in the request type 501 and "initial priority" is set in the parameter 503. FIG. 5C shows an example of an allocation request 500B in which "allocation" is set in the request type 501 and "size" is set in the parameter 503. FIG. 5D shows an example of a release request 500C in which "free" is set in the request type 501 and "size" and "disk area" are set in the parameter 503. FIG. 5E shows an example of an administration information read request 500D in which "administration information read" is set in the request type 501, and "administration information ID" is set in the parameter 503.

FIG. 6 shows a flowchart of temporary area registration. The logical volume administration program 160 sends the registration request 500A to the disk pool administration program 170 (step 600). When the disk pool administration program 170 receives the registration request 500A (step 610), the logical volume ID is registered in the disk pool accounting table 230 (step 611), and the initial priority is registered in the disk pool accounting table 230 (step 612). A corresponding disk area use amount and use history are initialized (step 613), a registration end reply is transmitted to the logical volume administration program 160 (step 614), and the routine is finished. The logical volume administration program 160 receives the registration end reply (step 602). After that, the maximum allocable size to the temporary area is registered in the logical volume administration table 200 (step 603), and the routine is finished.

Figure 7:
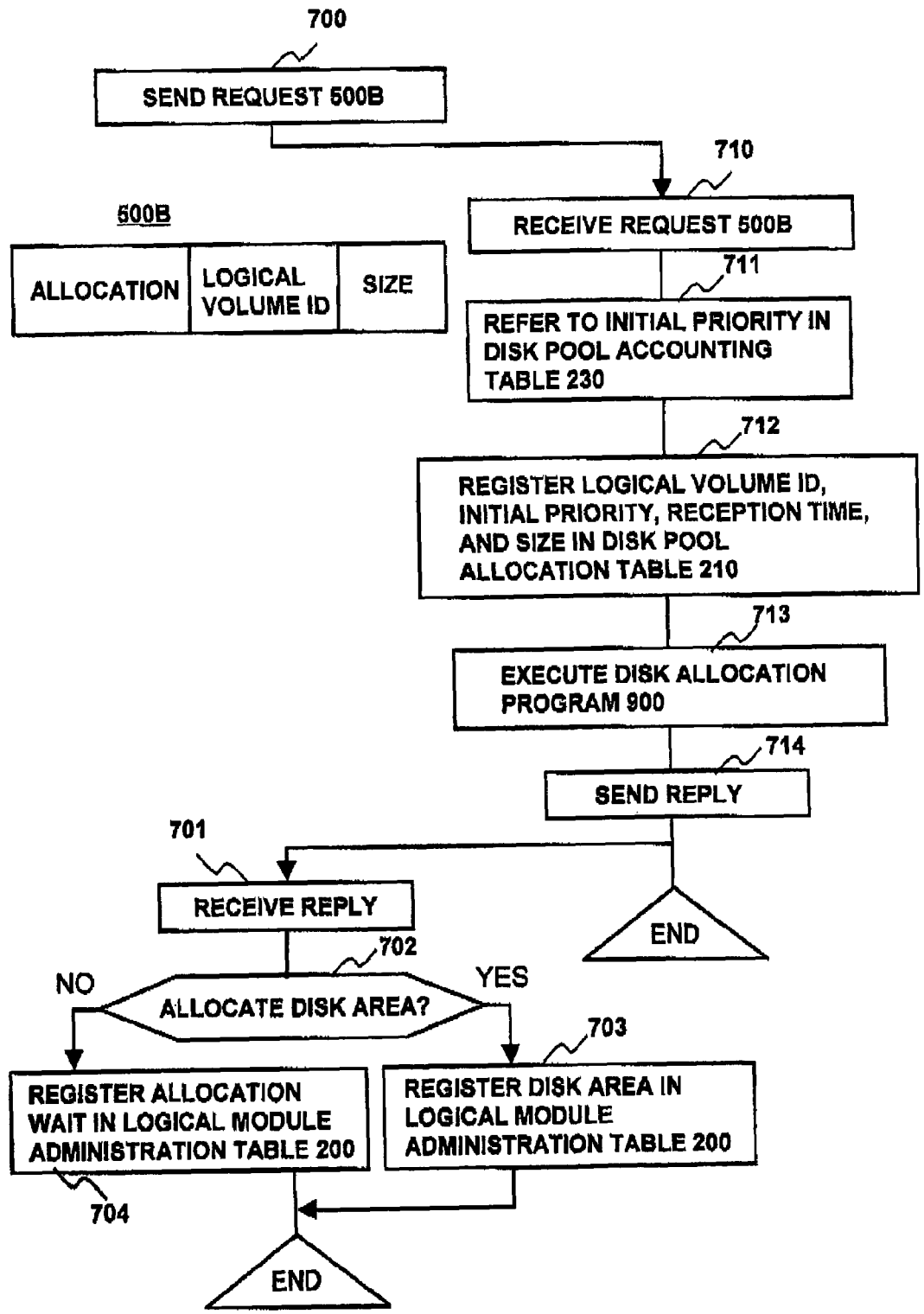
FIG. 7 is a flowchart of temporary area allocation of the invention.

FIG. 7 is a flowchart of allocation of a temporary area. The logical volume administration program 160 sends the allocation request 500B to the disk pool administration program 170 (step 700). When the disk pool administration program 170 receives the allocation request 500B (step 710), the initial priority is read by referring to the disk pool accounting table 230 (step 711). The logical volume ID, initial priority, size, and allocation request reception time are registered in the disk pool allocation table 210 (step 712), and the disk pool allocation program 900 is executed (step 713). When a disk area is allocated by the execution, notification of allocation and the allocated disk area are transmitted as a reply to the logical volume administration program 160, when no disk area is allocated, allocation wait notification is transmitted as a reply to the logical volume administration program 160 (step 714), and the routine is finished. When the logical volume administration program 160 receives the reply (step 701), whether the disk area is allocated or not is checked (step 702). If YES, the allocated disk area is registered in the logical volume administration table 200 (step 703), and the routine is finished. When no disk area is allocated, the allocation wait status is registered in the logical volume administration table 200 (step 704), and the routine is finished.

Figure 8:
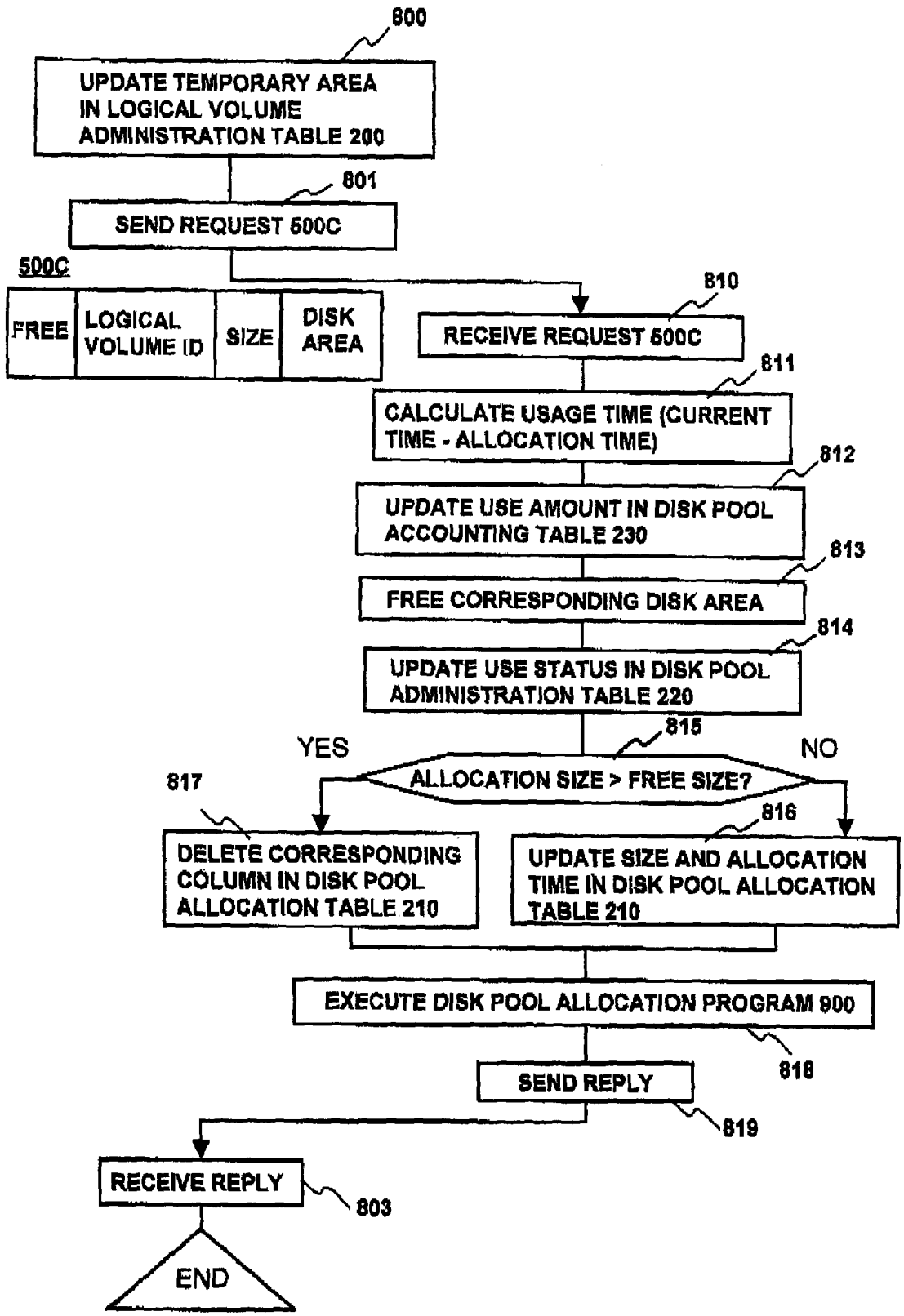
FIG. 8 is a flowchart of temporary area freeing of the invention.

FIG. 8 is a flowchart of freeing a temporary area. The logical volume administration program 160 updates the temporary area in the logical volume administration table 200 (step 800) and transmits the free request 500C to the disk pool administration program 170 (step 801). When the disk pool administration program 170 receives the allocation request 500C (step 810), use time is calculated from current time and the allocated time in the disk pool allocation table 210 (step 811), and the use amount of the disk pool accounting table 230 is updated (step 812). Concretely, a numerical value obtained by multiplying the size in the disk pool allocation table 210 by use time is added to the usage amount in the disk pool accounting table 230. The disk area designated by the free request 500C is freed (step 813), and the use status of the disk area freed in the disk pool administration table 220 is changed from "being used" to "unused" (step 814). Subsequently, whether the allocation size in the disk pool allocation table 210 is larger than the size of the freed disk area or not is checked (step 815). If YES, the size of the freed disk area is subtracted from the allocation size in the disk pool allocation table 210, and the allocated time is updated to the current time (step 816). When the allocation size and the size of the freed disk area are equal to each other (there is no case that the size of the freed disk area is larger than the allocation size), the corresponding allocation request in the disk pool allocation table 210 is eliminated (step 817). The disk pool allocation program 900 is executed (step 818), and the free end reply is transmitted to the logical volume administration program 160 (step 819). The free end reply is received by the logical volume administration program 160 (step 803), and the temporary area freeing process is finished.

Figure 9:
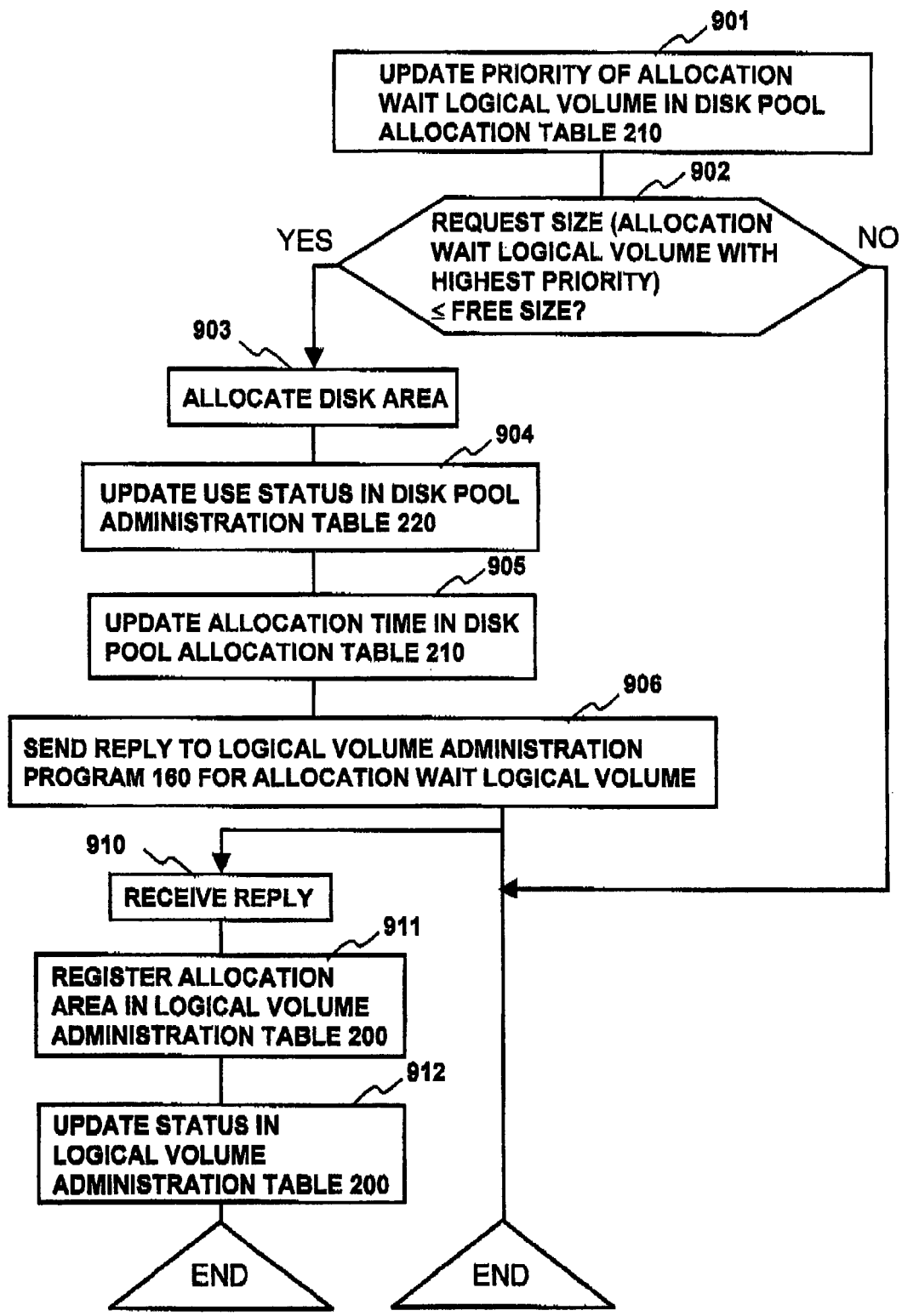
FIG. 9 is a flowchart of a disk pool allocation program of the invention.

FIG. 9 is a flowchart of the disk pool allocation program 900. The priority of the disk area allocation wait logical volume of the disk pool allocation table 210 is updated (step 901). Concretely, the allocation wait time is calculated from the current time and the allocation request reception time, and the priority is increased according to the allocation wait time. Whether the allocation request size of the logical volume having the highest priority on allocation wait is equal to or smaller than the vacant size of the disk pool is checked (step 902). If YES, the disk area is allocated (step 903), and the use status of the allocated area in the disk pool administration table 220 is updated from "unused" to "being used" (step 904). The allocation time of the disk pool allocation table 210 is updated to the present time (step 905), a reply including the allocation notification and the allocated area is transmitted to the logical volume administration program 160 for administering the logical volume to which the disk area is allocated (step 906), and the routine is finished. When the disk area allocation notification reply is received (step 910), the logical volume administration program 160 registers the allocated area to the logical volume administration table 200 (step 911), the allocation wait status is freed (step 912), and the routine is finished.

Figure 10:
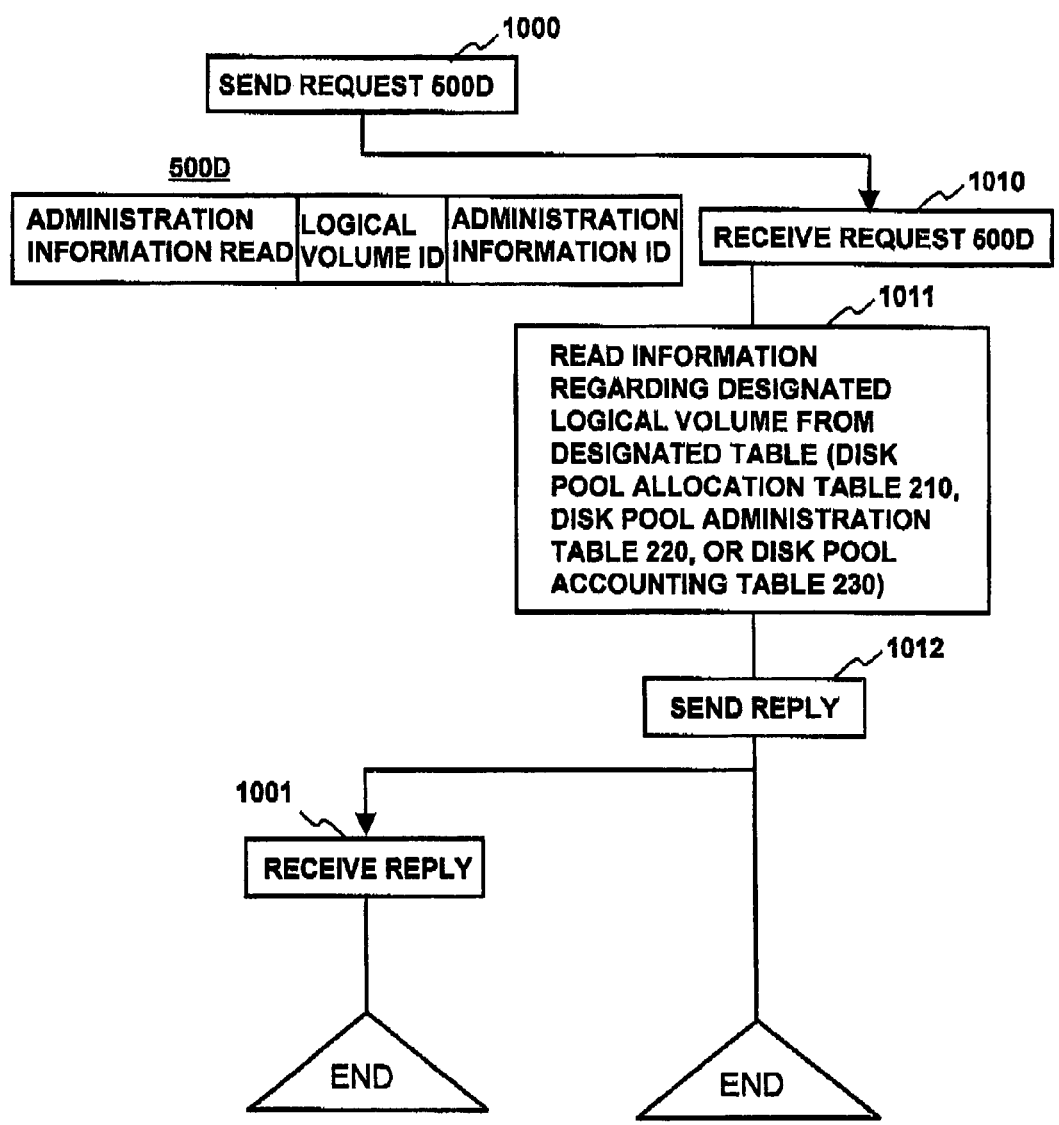
FIG. 10 is a flowchart of disk pool administration information reading operation of the invention.

FIG. 10 is a flowchart of disk pool administration information reading operation. The logical volume administration program 160 sends the disk pool administration information read request 500D to the disk pool administration program 170 (step 1000). When the disk pool administration program 170 receives the administration information read request 500D (step 1010), information of a designated logical volume is read from an administration table designated by the request (disk pool allocation table 210, disk pool administration table 220, or disk pool accounting table 230) (step 1011), the read information is transmitted to the logical volume administration program 200 (step 1012), and the routine is finished.

Figure 14:
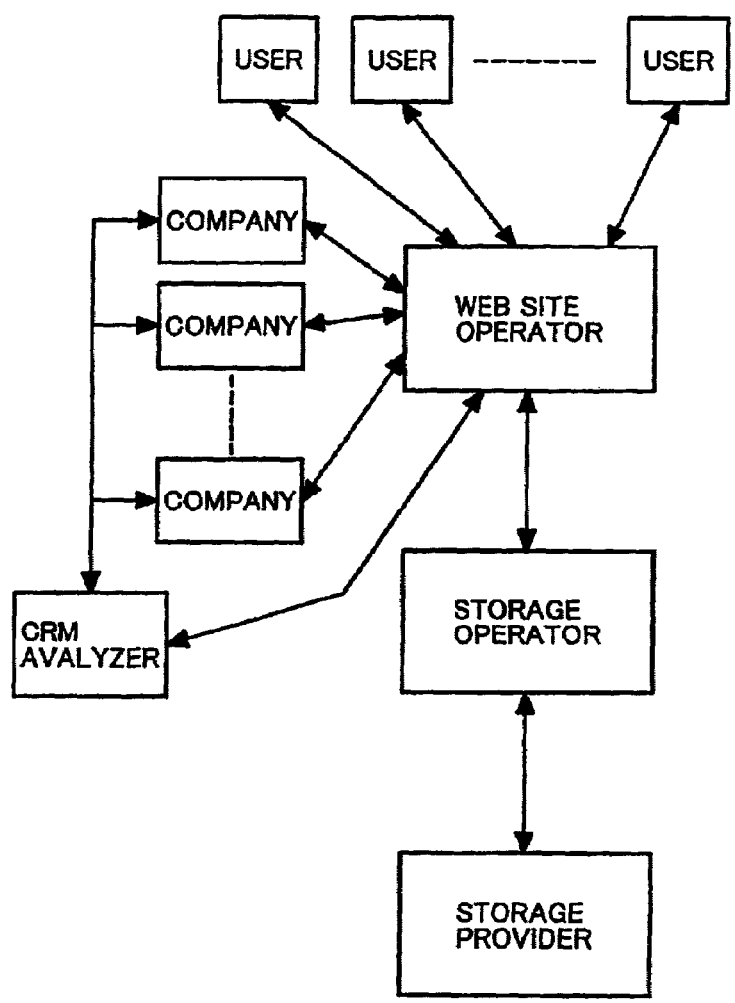
FIG. 14 is a diagram for explaining the form of business which can use the logic volume administration method of the invention.

In such a manner, the disk pool 180 of the disk apparatus described by referring to FIG. 1 can be effectively operated. As described in FIG. 14, there are various patterns according to administrators of such operations. Specifically, the invention can be carried out by any of the Web site operator, storage operator, storage provider, and CRM analyzer as service providers for providing a logical volume. It is sufficient for a company desiring to be a service provider to enter into a necessary contract with a related company and provide CRM analysis service.

Figure 11:
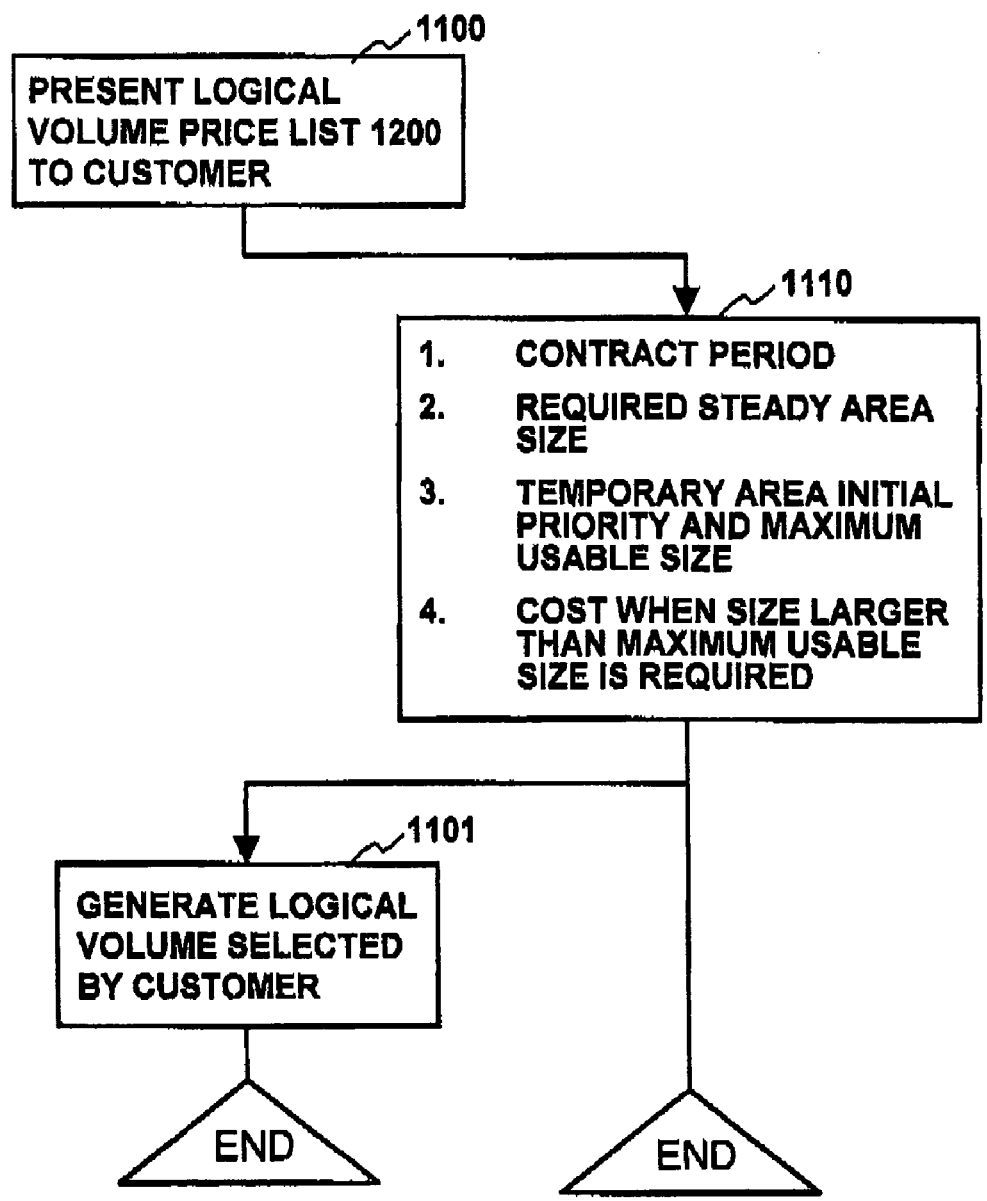
FIG. 11 is a flowchart of logical volume providing service of the invention.

FIG. 11 is a flowchart of logical volume providing service. The service provider presents a logical volume price list 1200 (step 1100). A customer who receives the CRM analysis service selects contrast period, use size of the steady area, maximum usable size of the temporary area, initial priority, and cost in the case where a size larger than the contract maximum use size is necessary (step 1110). The service provider executes the logical volume generation command 300 in which the value selected by the customer is set as a parameter to thereby generate a logical volume (step 1101). The use size of the steady area is based on a size necessary to provide a Web page, a size necessary to temporarily hold history in correspondence with an access and move it to a tape, and the like. The maximum usable size of the temporary area is based on the size expected to be necessary when a normal access is made when the CRM analysis service is received steadily. A case of requiring a size larger than the promised maximum usage size is assumed in order to deal with a case where the CRM analysis service cannot be received with the usable maximum size when an unexpected large number of accesses are made. Since the promised maximum usage size is set to be large in consideration of even such a special case, the steady burden on the customer increases. When both of the sizes can be selected, a total cost burden can be reduced.

FIG. 12 shows an example of the format of the logical volume accounting table. When the customer selects contract period, use size of the steady area, maximum usable size of a temporary area, and initial priority, a contract price of a logical volume is determined. In the case of using the temporary area, a price obtained by adding "use amount× usage unit price" to the contract price is charged. The usage unit price denotes, for example, a price in the case of using 1TB for one hour. When the CRM analysis is made by using the size exceeding the promised maximum usable size, the exceeded amount is additionally charged.

Figure 13:
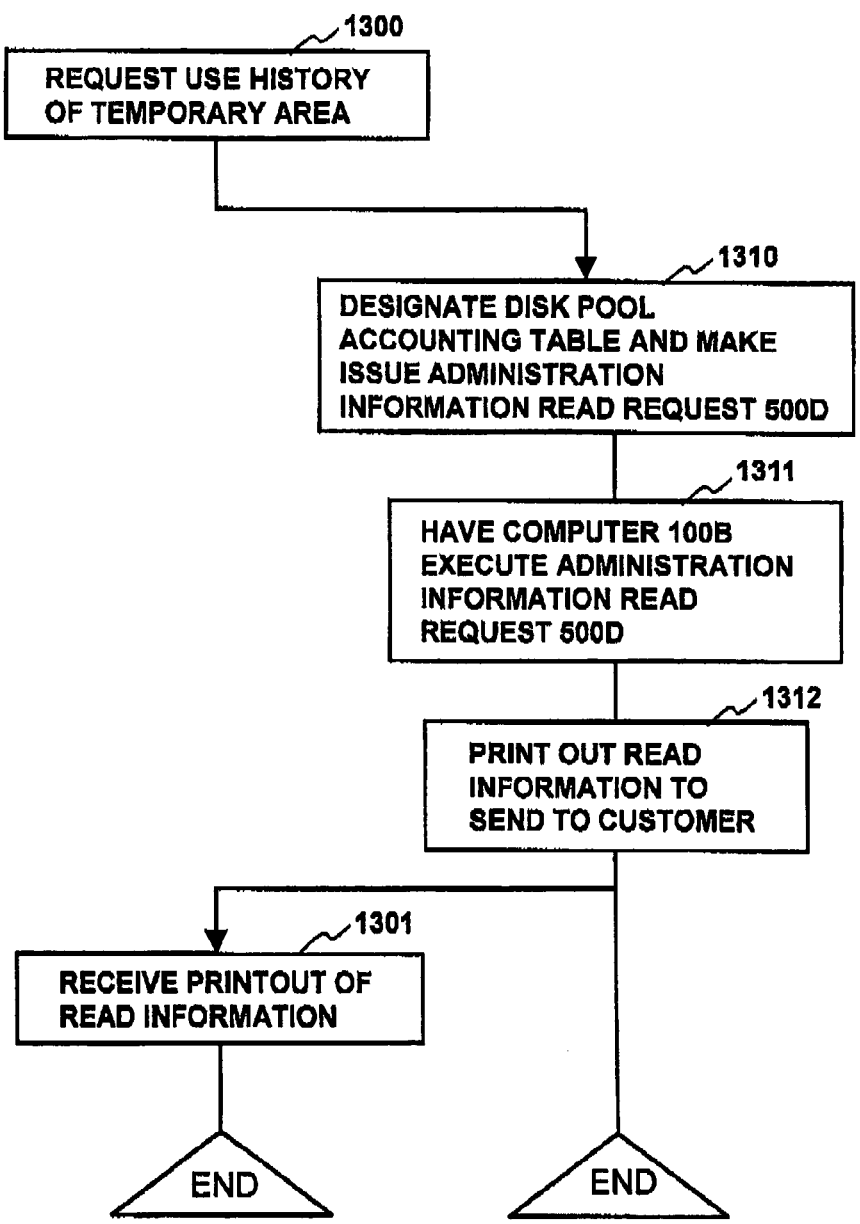
FIG. 13 is a flowchart of temporary area usage history providing service of the invention.

FIG. 13 is a flowchart of temporary area using service. When the customer requests temporary area usage history to the service provider (step 1300), the service provider allows the administration information read request in which the disk pool accounting table 230 is designated as administration information to be read to be issued (step 1310), and the read usage history is printed and provided to the customer (step 1311). Obviously, data can be provided in place of a printout.

According to the invention, like CRM analysis service, in a case where a storage of a large capacity to deal with a large amount of data is necessary but the customer does not have to always occupy the storage, a system for providing service at low cost can be configured.

The invention can be also carried out in forms as described hereinbelow other than claims.

1. A computer system comprising: a disk apparatus as a storage; a first computer for allocating a disk area in the disk apparatus in accordance with an application; a second computer for administering allocation of the disk area in the disk apparatus; and an interconnecting network for connecting those components, wherein a logical volume of the disk apparatus is constructed by a steady area corresponding to a task of steadily allocating a disk area in the disk apparatus and a temporary area corresponding to a task of allocating no disk area until allocation of a disk area is requested, and a disk area is allocated to the temporary area as necessary in accordance with a task from a disk pool which is not commanded by any tasks.

2. A service using a computer system comprising: a disk apparatus as a storage; a first computer for allocating a disk area in the disk apparatus in accordance with an application; a second computer for administering allocation of the disk area in the disk apparatus; and an interconnecting network for connecting those components, and evaluating an access to the computer system from a system which can access the computer system from the outside of the computer system via the Internet by connecting the connecting network to the Internet, wherein a response to the access to the computer system and storage of access history are performed by using a steady area in a logical volume in the disk apparatus, and data related to storage of history of accesses to the computer is evaluated by using a temporary area in the logical volume in the disk apparatus.

3. A memory medium storing a service of evaluating an access via the Internet, wherein the service is a service using a computer system comprising: a disk apparatus as a storage; a first computer for allocating a disk area in the disk apparatus in accordance with an application; a second computer for administering allocation of the disk area of the disk apparatus; and an interconnecting network for connecting those components, and evaluating an access to the computer system in a system which can access the computer system from the outside of the computer system via the Internet by connecting the connecting network to the Internet, and response to an access to the computer system and storage of access history are performed by using a steady area in a logical volume in the disk apparatus, and data related to storage of history of access to the computer is evaluated by using a temporary area in the logical volume in the disk apparatus.

4. The service according to item number 2, wherein when a volume of history of accesses to the computer system via the Internet exceeds a predetermined volume, it is transferred to a tape apparatus.

5. The service according to item number 2 or 3, wherein a contract between a side of providing the service and a side of receiving the service is defined by a size of a steady area in a logical volume of the disk apparatus and a size of a temporary area in the logical volume in the disk apparatus.

6. The service according to item number 5, wherein the contract allows usage of a size exceeding the size of the temporary area and includes the cost corresponding to the exceeded size.

7. The service according to item number 4, wherein a charge amount is determined from a contract price determined by parameters of the steady area and the temporary area and a price according to a usage amount of the temporary area.

8. The service according to item number 4, wherein when the initial priority is high, a contract price of the temporary area is high.

What is claimed is:

1. A logical volume administration method, comprising: designating a plurality of logical volumes in a disk apparatus serving as a storage each of which is constructed by a steady area to which a disk area in the disk apparatus is steadily allocated to and a temporary area to which a disk area in the disk apparatus is not allocated until a task issues reads and writes to the temporary area;

allocating first disk areas in said disk apparatus as a plurality of steady areas of said plurality of logical volumes; and allocating second disk areas in said disk apparatus, which are different from said first disk areas, as a disk pool, and allocating disk areas from said disk pool in a time sharing manner to serve as said plurality of temporary areas of said plurality of logical volumes when the task issues reads and writes to the temporary areas.

2. The logical volume administration method according to claim 1, further comprising a step of setting priorities of said temporary areas and a step of allocating disk areas of the disk pool to serve as the temporary areas in accordance with said priority.

3. The logical volume administration method according to claim 1, wherein the priority of each of said temporary areas sets higher according to a time period length during which a logical volume is waiting for allocation.

4. The logical volume administration method according to claim 1, wherein said disk areas of said disk pool are allocated to serve as said temporary areas when said disk areas of said disk pool are not yet allocated to serve as a temporary area.

5. A computer system comprising:
a disk apparatus; and
a computer which designates one of first disk areas of said disk apparatus to each of a plurality of logical volumes, wherein each of said logical volumes includes a steady area to which-one of the first disk areas in the disk apparatus is steadily allocated to and a temporary area to which a disk area in the disk apparatus is not allocated until a task issues reads and writes to the temporary area; and
said computer allocates second disk areas in said disk apparatus, which are different from the first disk areas, as a disk pool, and allocates disk areas from said disk pool in a time sharing manner to serve as said temporary area of each of said logical volumes when the task issues reads and writes to the temporary area.

6. The computer system according to claim 5, wherein said computer sets priorities of said temporary areas and allocates said disk areas of the disk pool to the temporary areas in accordance with said priority.

7. The computer system according to claim 6, wherein the priority of each of said temporary areas sets higher according to a time period length during which a logical volume is waiting for allocation.

8. A computer system comprising:
a storage apparatus; and
a computer which designates one of first storage areas of said storage apparatus to each one of a plurality of logical volumes, said logical volumes being accessed by a task by issuing write in and read out,
wherein said storage apparatus includes said first storage areas and second storage areas which form a disk pool;
each of said logical volumes includes a steady area allocated from said first storage area of said storage apparatus and a temporary area from said disk pool of said storage apparatus; and
said computer allocates storage area from said disk pool of said storage apparatus to serve as temporary areas of said logical volumes in a time sharing manner when the task issues reads and writes to the temporary areas.

9. The computer system according claim 8, wherein said temporary areas of said logical volumes are Web page repository or Web access history repository.

* * * * *